United States Patent [19]

Stevenson et al.

[11] Patent Number: 5,080,441

[45] Date of Patent: Jan. 14, 1992

[54] SAFETY SEAT FOR A CHILD FOR AIRPLANE USE

[76] Inventors: Jennifer L. Stevenson, 613 Yarmouth Ln., Bel Air, Md. 21014; Claudia C. Orjuela, 1815 Blakefield Cir., Lutherville, Md. 21093

[21] Appl. No.: 560,077

[22] Filed: Jul. 27, 1990

[51] Int. Cl.$^5$ .................. A47C 31/00; B60R 21/00
[52] U.S. Cl. ..................... 297/488; 297/467
[58] Field of Search ............... 297/4, 216, 464, 465, 297/467, 468, 470, 471, 473, 474, 475, 482, 483, 484, 485, 486, 487, 488; 280/801, 805, 807, 808

[56] References Cited

U.S. PATENT DOCUMENTS

| 4,099,778 | 7/1978 | Lehr | 280/805 X |
|---|---|---|---|
| 4,591,208 | 5/1986 | McDonald et al. | 297/250 X |
| 4,610,463 | 9/1986 | Efrom | 280/801 X |
| 4,674,800 | 6/1987 | Ensign | 297/464 X |
| 4,679,852 | 7/1987 | Anthony et al. | 297/464 |
| 4,688,849 | 8/1987 | Tsuge et al. | 297/250 |
| 4,738,489 | 4/1988 | Wise et al. | 297/487 |
| 4,762,369 | 8/1988 | Nicod | 297/464 X |

FOREIGN PATENT DOCUMENTS

| 2932150 | 2/1981 | Fed. Rep. of Germany | 297/487 |
|---|---|---|---|
| 2309375 | 2/1976 | France | 297/488 |

Primary Examiner—Kenneth J. Dorner
Assistant Examiner—James M. Gardner
Attorney, Agent, or Firm—Walter G. Finch

[57] ABSTRACT

An airline safety seat is provided having a lap bolster for use adjacent a minor, such as a child. A retractor system consisting of two tension straps are connected to a male buckle adapter so that they may be pulled at the same rate as they pass over the head of a user and then buckled between the legs of the user. The tension straps are designed so that they may be fully extended without tension pull to engage a snapping pull so that they may retract and encompass a user thereof. These tension straps are connected to inertial rollers or reels mounted inside the lap bolster. The rollers or reels are suitably mounted. A buckle system is retracted into the lap bolster by the two inertial rollers or wheels. A male adapter system is pulled over the user's head and down the back to be buckled between the legs of the user to meet a female attachment. The female attachment extends approximately one inch out of the lap bolster. The portion inside the lap bolster is provided with a metal weight rolled at the end and a metal plate with three bolts preceding it to hold the system to the hard front face plastic. The metal weight at the end ensures a firm hold of the system. A strap retainer is provided to hold the straps close together and in place at the upper back of a user. The retainer is adjustable on the straps as desired.

3 Claims, 4 Drawing Sheets

U.S. Patent  Jan. 14, 1992  Sheet 1 of 4  5,080,441
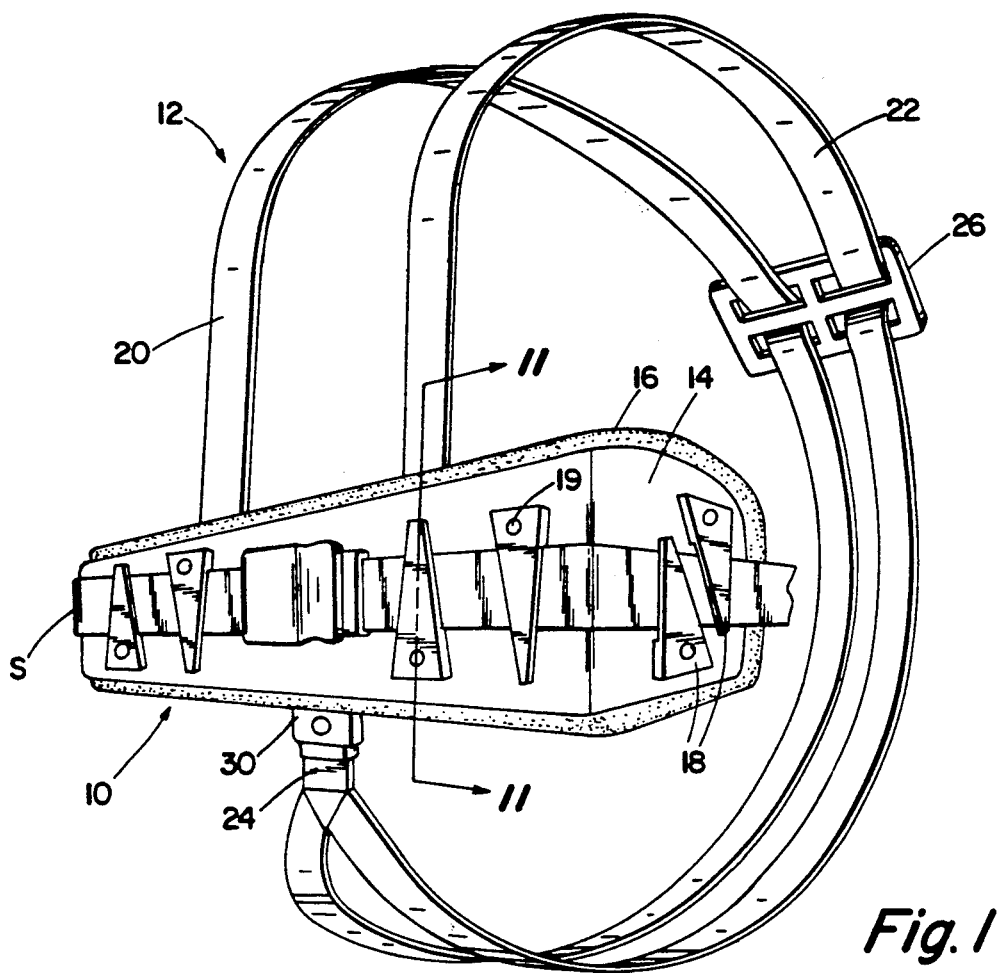
Fig. 1
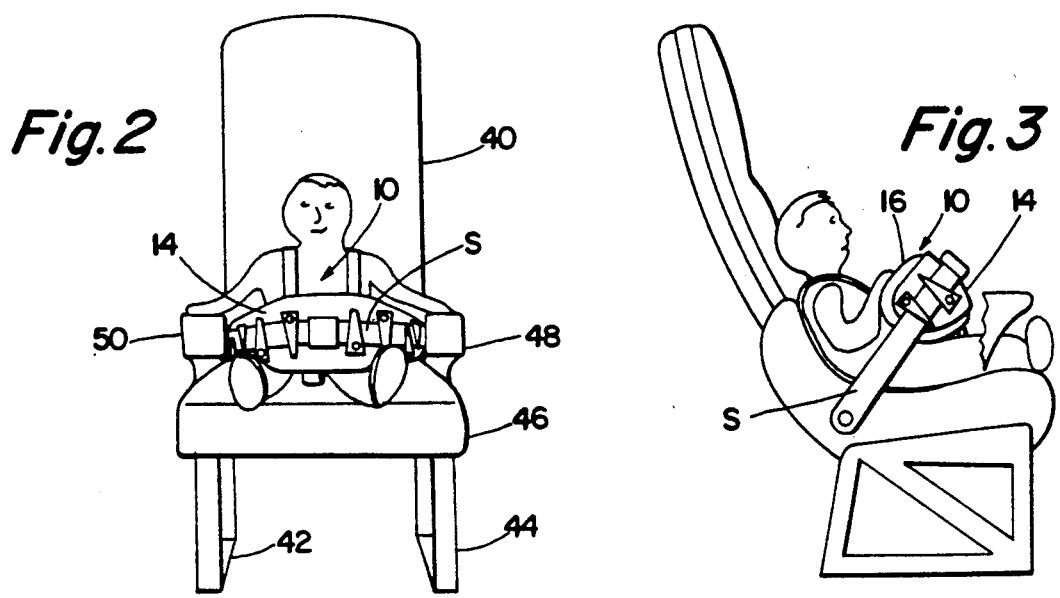
Fig. 2
Fig. 3

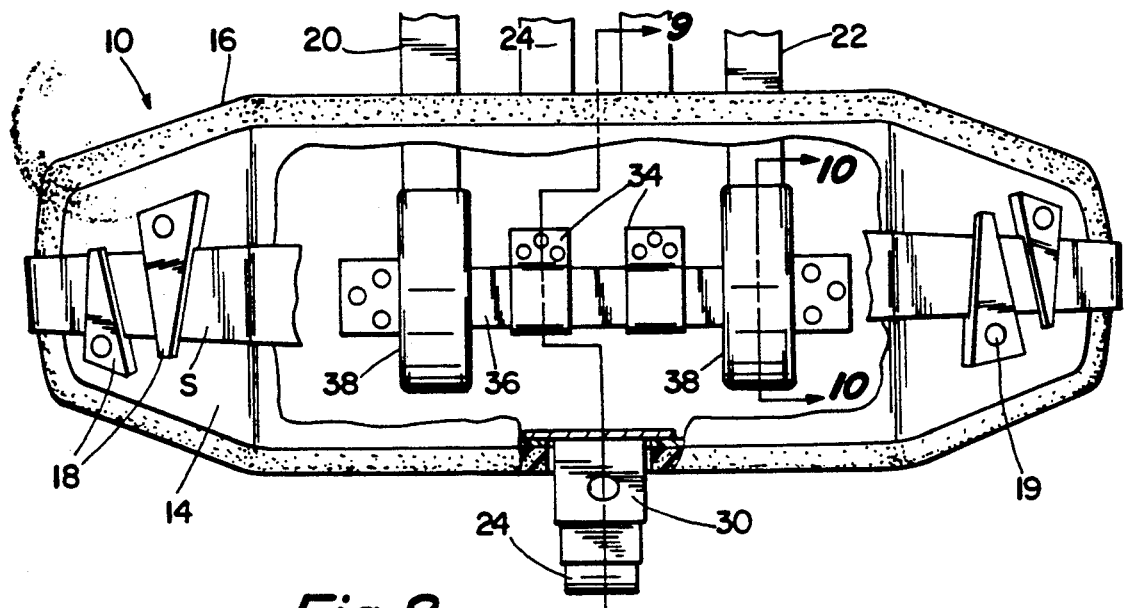
Fig. 8
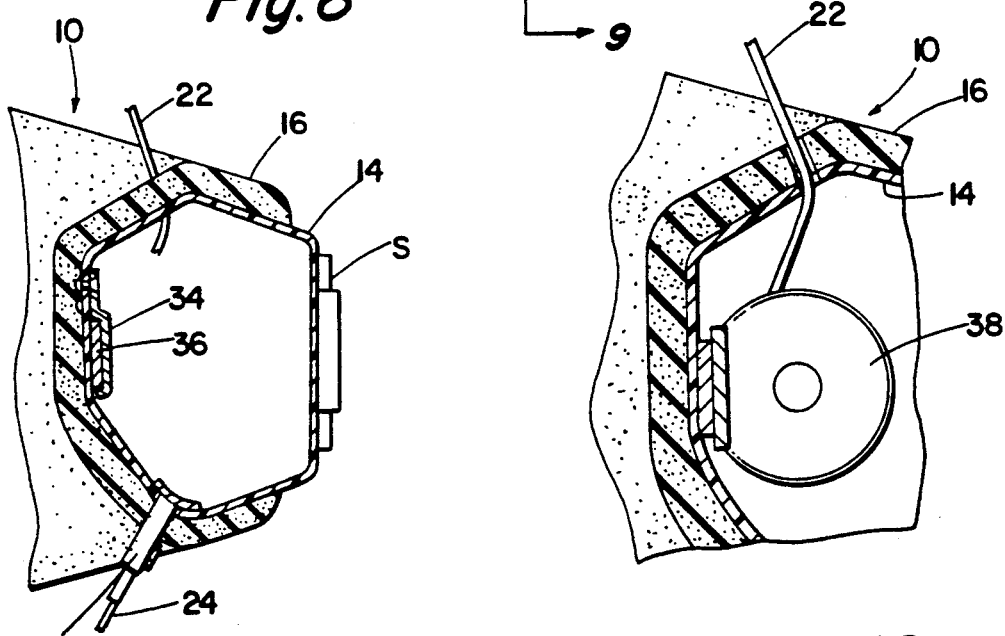
Fig. 9
Fig. 10
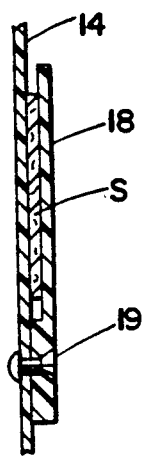
Fig. 11

SAFETY SEAT FOR A CHILD FOR AIRPLANE USE

BACKGROUND AND SUMMARY OF THE INVENTION

This invention relates to safety seats, and more particularly to a novel design of a safety seat for use in restraining minors and/or children while in a seat traveling on an airplane.

PRIOR ART

The best prior art U.S. Pat. Nos. are as follows:

| | |
|---|---|
| 4,033,622 Boudreau | 4,650,252 Kassai |
| 4,047,755 McDonald et al | 4,655,503 Kamijo et al |
| 4,067,608 Von Wimmersperg | 4,674,800 Ensign |
| 4,541,425 Yetter, Jr. | 4,679,852 Anthony et al |
| 4,569,534 Nalbandyan et al | 4,679,854 Putsch et al |
| 4,579,385 Koenig | 4,707,031 Meistrell |
| 4,610,463 Efrom | 4,735,426 McConnell |
| 4,613,188 Tsuge et al | 4,762,369 Nicod |
| 4,627,587 McCutchan et al | 4,779,930 Rosen |
| 4,637,629 Cummings | 4,787,677 Reighter |

The Boudreau U.S. Pat. No. 4,033,622 teaches a seat for restraining an infant in a car. A steel truss frame is provided to which is secured a molded plastic shell. The child sets or reclines in the shell.

The McDonald U.S. Pat. No. 4,047,755 teaches the use of a bracket or brackets on the rear seat of a vehicle having slots to prevent accidental shifting of the positioning bar and seat.

U.S. Pat. No. 4,067,608 to Von Wimmersperg teaches a child restraining device which is secured to a vehicle seat. It has two legs to engage a floor structure of the vehicle. This arrangement retains a child in a stable position in the seat.

The Yetter U.S. Pat. No. 4,541,425 teaches an arrangement for restraint of a head and torso of a person through a strap attached to the head of a patient and the back of the chair, and a pair of pillows, one each, located on opposite sides of a patient. Suitable straps are arranged to hold the pillows in position.

The Nalbandyan et al U.S. Pat. No. 4,569,534 teaches a restraining system for a vehicle wherein suitably controlled hinged frames carrying flexible sheetlike passenger restraints and adjacent mechanism to restrain a passenger within a seat.

The Koenig U.S. Pat. No. 4,579,385 teaches a cushioning device consisting of joined flexible sheets, together with a valve device for pressurizing the air between the sheets to protect a minor.

The Efrom U.S. Pat. No. 4,610,463 teaches the use of a dome like shield to protect the abdominal area of a pregnant woman when seated in an automobile. A strap is provided to hold the woman in the seat.

A child restraining device is disclosed in Tsuge et al U.S. Pat. No. 4,613,188. It consists of a reclining mechanism having a supporting member for a child receiving vessel which is rotatably mounted in a step manner thereon through a crank means.

The McCutchan et al U.S. Pat. No. 4,627,587 teaches a cushion formed of buoyant material for an airplane seat. The cushion is removably attached to the seat by suitable means. Straps are provided on the cushion for the arms of a passenger sitting on the cushion. The passenger is coupled to the cushion. The cushion can be separated from the seat by pulling the cushion away from the seat.

The Cummings U.S. Pat. No. 4,637,629 teaches the use of criss-crossing straps, together with a pair of tension straps to provide a non-encumbering torso restraint system for a crew member.

The Kassai U.S. Pat. No. 4,650,252 shows a body carriage with a seat having an annular belt section and a flexible belt connecting section. The belt section makes use of buckles when they are engaged with each other, the annular belt section surrounds the entire periphery of the torso of a child to hold it in position.

The Kamijo et al U.S. Pat. No. 4,655,503 shows a seat arrangement which can be used for both restraining a child and normally by an adult.

The Ensign U.S. Pat. No. 4,674,800 teaches a child-restraining car safety seat making use of suitably restrained inner and outer pouches for an infant, while the Anthony et al U.S. Pat. No. 4,679,852 teaches a remote harness web adjuster for controlling the size of the harness.

The Putsch et al U.S. Pat. No. 4,679,854 teaches a vehicle seat that has restraining members to protect a user in a lateral direction without interfering with the freedom of movement of the user.

The Meistrell U.S. Pat. No. 4,707,031 teaches a heat support for a child sitting in a chair having a headrest, including the use of a band, band retention structure and head restraining structure for restraining the movement of the head of a user.

The Nicod U.S. Pat. No. 4,762,369 teaches a safety harness for holding and restraining a user, while the Rosen U.S. Pat. No. 4,779,930 makes use of a resilient support for the head of an infant and infant retaining devices.

The Reighter U.S. Pat. No. 4,787,677 teaches a compact, collapsible, lightweight restraining device for a child. The device is detachable.

STATEMENT OF THE PROBLEM

Children travelling on airlines have difficulty remaining in their seats while the airplane is in flight. Quite often, a parent will place a child in a seat of the aircraft, only to find that child has slipped out of the seat and wandering around in the aircraft.

Also, the aircraft quite often, does not have proper seat accommodations for children of various sizes. The result of this is that often a child is hurt or injured while in flight on an aircraft.

Also, if there is an airplane accident or crash, children including handicapped children or individuals may be harmed or injured.

SUMMARY OF THE INVENTION

An airline safety seat is provided to protect small children and or handicapped individuals from harm in the event of an airline accident. The safety seat is compact so that all airlines may store the safety seats without any great loss of space. The safety seat is designed with safety in mind without being overly restricting to the individual.

A lap bolster is provided that is a self contained safety device which may be used in airliners for both infants and handicapped individuals. The safety seat provides a cushion as well as a restraint system to the passenger. The safety seat may be used as it is drawn to buckle between the legs or turned over to the reverse and buckle in front at the chest of an individual.

A plastic strap retainer is provided to hold the straps close and in place at the upper back of an individual. The retainer can be adjusted and moved about the strap system with some work when no tension is present. It is to be 4 by 2 inches and have four slit apertures so that the straps may pass.

A retractor system is also provided. It consists of two tension straps connected at a male buckle adapter, so that they may be pulled at the same rate as they pass over the head to then buckle between the legs. The tension straps will also have a workable stop tension so that they may be fully extended without tension pull, to then engage with a snapping pull so that they may retract and encompass the individual. The tension straps are connected to inertial reels mounted inside a lap bolster. One strap is positioned to the right and the other strap is positioned to the left to provide the restrain system. The wheels spin off one central bar which is mounted with a bent "S" shaped metal bar, bolted to the front face hard plastic facing. The wheels are again mounted at the sides with yet another metal plate system.

A buckle system is retracted into the lap bolster by the two inertial wheels. The male adapter system is then pulled over the head of the individual and down the back thereof to be buckled between the individuals legs to meet the female attachment. Fabric is woven over the male system several times to ensure a sturdy hold. The female attachment extends approximately one inch out of the lap bolster. The portion inside of the lap bolster is provided with a metal weight rolled at the end and a metal plate with three bolts preceding it to hold the system to the hard front face plastic. A metal weight at the end ensures a firm hold of the system.

OBJECTS OF THE INVENTION

One of the objects of this invention is to provide a safety seat to protect minors, such as small children and/or handicapped children from harm in an airline flight as well as in an aircraft accident.

Still another object of the invention is to provide a compact safety seat for use by minors in aircraft that may be stored without great loss of space in the aircraft.

To provide a safety seat for use by minors in aircraft which is designed with safety in mind without being overly restricting to the user, is still another object of this invention.

And still other objects of this invention are to provide a safety seat for an aircraft which is economical to manufacture, easy to install in position in an aircraft for use, which is efficient and reliable in operational use, and which is easy to maintain and quickly remove for storage in a minimum of space.

Further objects and attendant advantages of the invention will become more apparent in light of the following detailed description and accompanying drawings of the preferred embodiments.

FIG. 1 is a perspective view of a safety seat for children for use on an airline incorporating preferred features of this invention;

FIG. 2 is a front view of the safety seat of FIG. 1 in position in an airline seat in operative position;

FIG. 3 is a side view of the safety seat of FIG. 2 in operative position;

FIG. 8 is a front view of a portion of the safety seat of FIG. 1 with parts removed and partially in cross section;

FIG. 9 is a cross section taken along line 9—9 of FIG. 8 looking in the direction of the arrows;

FIG. 10 is a cross section taken along line 10—10 of FIG. 8 looking in the direction of the arrows; and FIG. 11 is a cross section taken along line 11—11 of FIG. 1 looking in the direction of the arrows.

DESCRIPTION OF THE PREFERRED EMBODIMENTS

Figure 4:
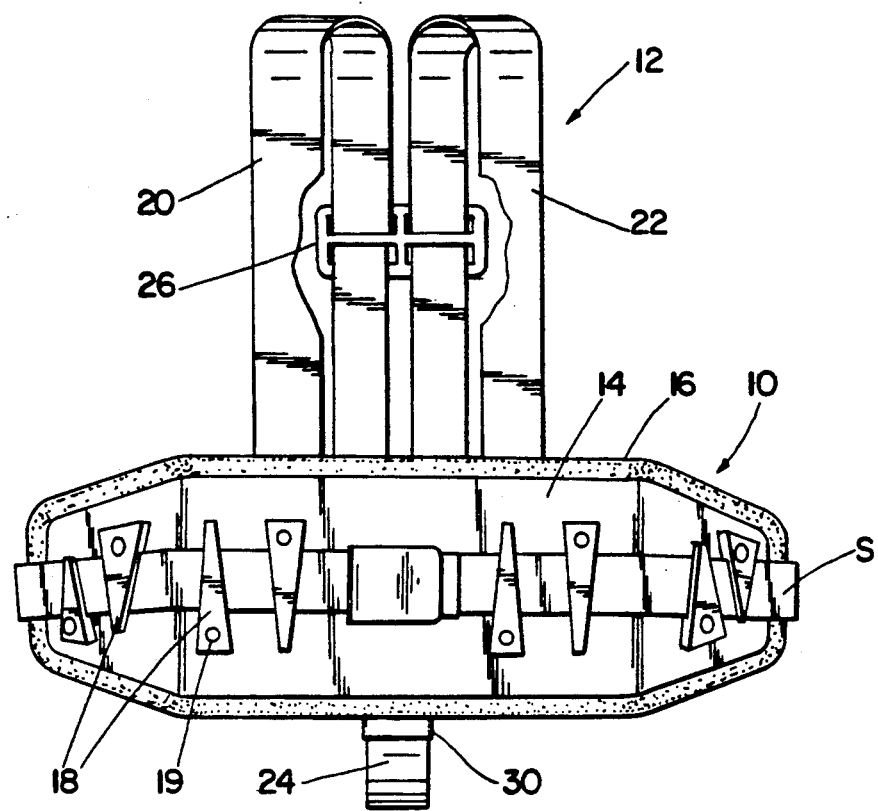
FIG. 4 is a front view of the safety seat of FIG. 1.
Figure 5:
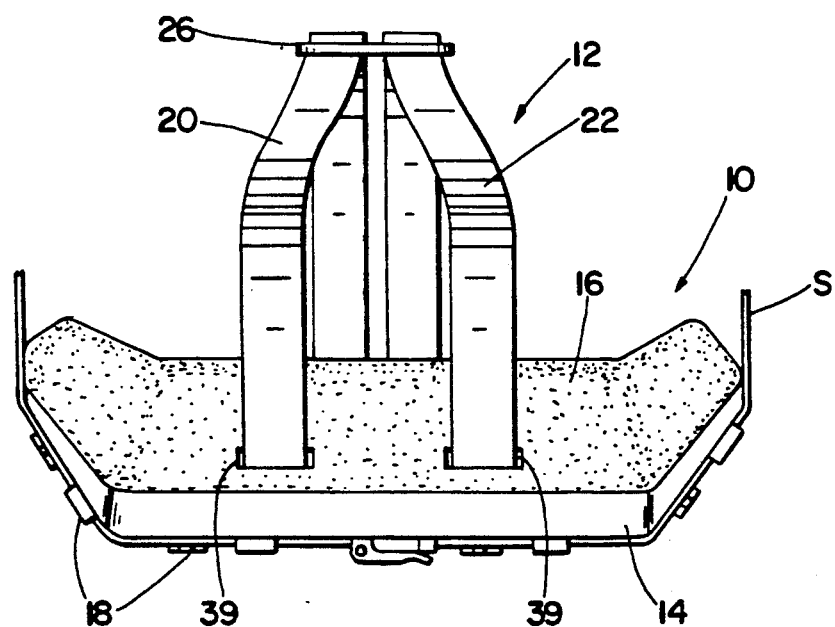
FIG. 5 is a top front view, looking down, of the safety seat of FIG. 1.

Referring now generally to FIGS. 1 to 8 of the drawings, and particularly to FIGS. 2 and 3, there is shown a main and conventional aircraft seat structure 40 having two legs 42 and 44, a seat 46, and two arms 48 and 50. The safety seat lap bolster 10 of the present invention is shown installed on a minor on the seat 46 and between the pivoted arms 48. A seat belt S and a carcass 14 of a lap bolster 10, together with a sponge bolster wrap 16 (shown in FIG. 9) are shown in FIGS. 2 and 3, the arm 50 has been removed for clarity.

Referring now to FIGS. 1, 4, 5, 6, 7 and 8, of the drawings, the lap bolster 10 for holding a minor, such as a child in a safety position, is shown in greater detail. The lap bolster 10 is provided with a strap system 12 having right and left shoulder straps 20 and 22. The lower ends of the right and left shoulder straps 20 and 22 are connected to a bottom strap 24 and post member 30 secured to the lap bolster 10, as best shown in FIG. 4. The opposite ends pass through spaced slots 39 in the structure and are attached to their respective rolls or reels 38. A roller holding strap 36 shown in FIGS. 8 and 9 holds the rollers 38 in operative position, when an S-shaped roller clamp 34, best shown in FIGS. 8 and 9, is properly positioned.

The tension straps 20 and 22 are provided with a workable shop tension so that they may be fully extended without tension pull to them being engaged with a snapping pull so that they may retract and encompass a user, such as a minor. The tension straps 20 and 22 are connected to the inertial rollers or reels 38 mounted inside the lap bolster 10 as shown in FIGS. 8 and 9. There is provided one roller or reel 38 on the right side and one roller or reel 38 on the left side to provide a restraining system. The wheels for the system spin off of one central bar which is mounted with a bent S-shaped metal bar 34, bolted to a front face hard plastic facing. The rollers or reels 38 are again mounted on the sides with a metal plate system.

The lap bolster 10 is provided with a plurality of spaced seat belt retainer clips 18 on the seat belt S together with a clip retainer 19 for each retainer clamp 18.

Figure 6:
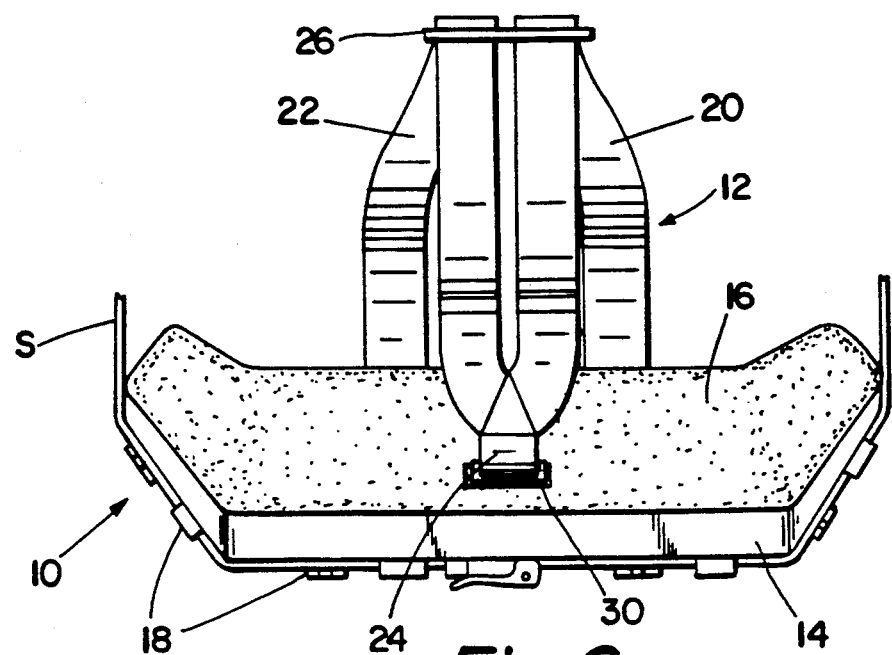
FIG. 6 is a top rear view, looking down, of the safety seat of FIG. 1.
Figure 7:
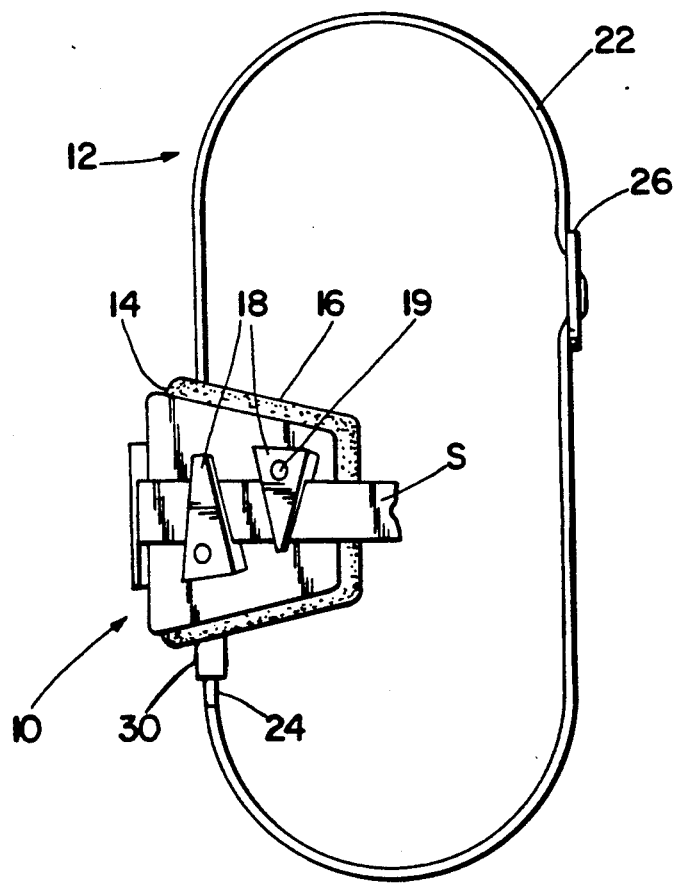
FIG. 7 is a right side view of the safety seat of FIG. 1.

As shown in FIGS. 1, 4, and 6, a strap separator 26 is provided to position the shoulder straps 20 and 22 a fixed distance apart in the lap bolster 10. This separator 26 is preferably formed of plastic and it is to hold the shoulder straps 20 and 22 close and in place at the upper back of a minor. The retainer 26 is arranged to be adjusted and moved about the strap system 12 with some work when no tension is present. It is (2" by 4") and has four slit holes so that the straps 20 and 22 can pass therethrough.

A spong bolster wrap 16 for the lap bolster 10 is provided as best shown in FIGS. 1, 4, 5, 6, 7 and 8, for protection of the minor child when in an operative position in the lap bolster 10.

The ends of the seat belt S of the lap bolster 10 are suitably secured to the sides of the aircraft seat structure 40, either by coupling clamps or the like.

The buckle system for the lap bolster 10 is retracted into the lap bolster 10 by the two inertial wheels or reels 38, previously mentioned. The male adapter system is then pulled over the individuals head and down the back to be buckled between the individuals legs to meet the female attachment. Fabric is woven over the male system several times to ensure a sturdy hold. The female attachment extends approximately one inch out of the lap bolster 10. The portion inside of the lap bolster 10 is provided with a metal weight rolled at the end and a metal plate with three bolts preceding it to hold the system to the hard front face plastic. The metal weight at the end is to ensure a firm hold of the system.

Accordingly, modifications and variations to which the invention is susceptible may be practiced without departing from the scope and intent of the appended claims.

What is claimed is:

1. An airline safety lap bolster, comprising, a lap bolster means extending in substantially the horizontal direction, seat belt means traversing the front of said lap bolster means, said seat belt means having a plurality of seat belt retainer clips with a retainer coupled to said lap bolster means, a pair of spaced strap means positioned substantially transversely of said lap bolster means, spaced reel means located on the interior of said lap bolster means, said strap means having opposite ends, one set of opposite ends of said strap means being coupled to the underside of said bolster means, and the other set of opposite ends of said lap bolster means being coupled to said spaced reel means for paying out and taking up said strap means.

2. An airline safety lap bolster as recited in claim 1, and sponge bolster wrap covering said lap bolster means.

3. An airline safety lap bolster as recited in claim 1, wherein said strap means form openings to accommodate the limbs of a user.

* * * * *